No. 708,369. Patented Sept. 2, 1902.
W. H. LEWIS.
PHOTOGRAPHIC PRINTING FRAME.
(Application filed Dec. 15, 1900.)
(No Model.)
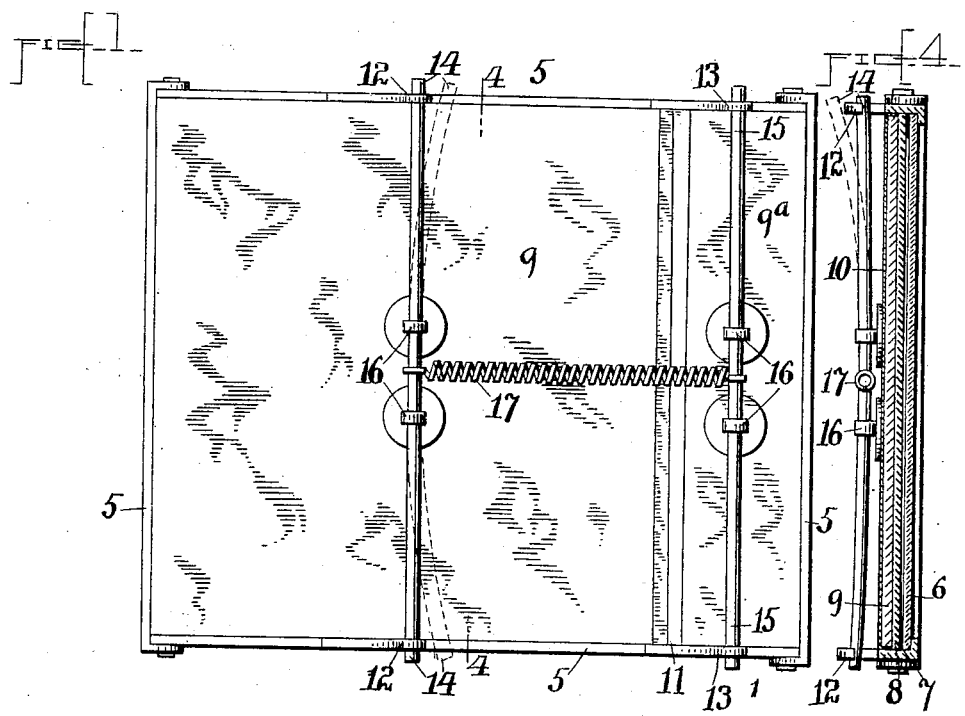
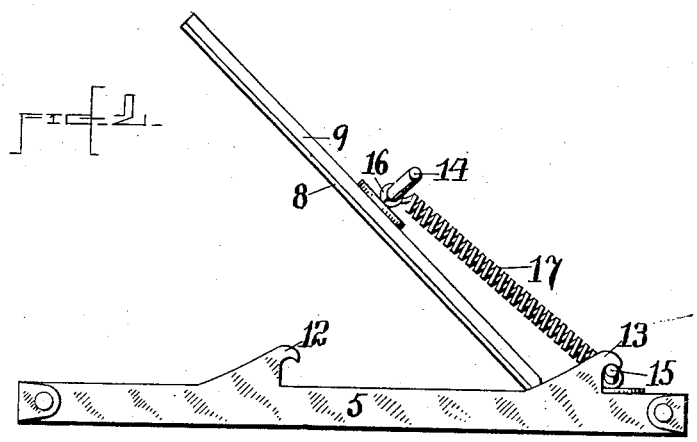
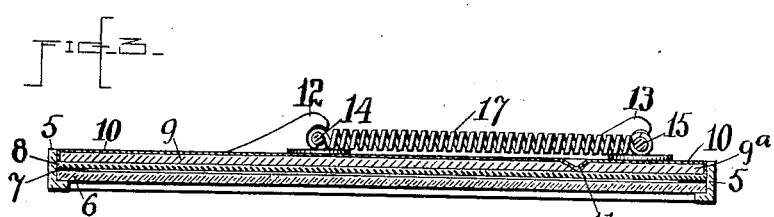
Witnesses:
Otto Greenberg
Josiah H. Peck
Inventor
William H. Lewis
By Henry M. Brigham
his Attorney

UNITED STATES PATENT OFFICE.

WILLIAM H. LEWIS, OF HUNTINGTON, NEW YORK, ASSIGNOR TO JAMES H. SMITH, OF CHICAGO, ILLINOIS.

PHOTOGRAPHIC-PRINTING FRAME.

SPECIFICATION forming part of Letters Patent No. 708,369, dated September 2, 1902.

Application filed December 15, 1900. Serial No. 39,986. (No model.)

*To all whom it may concern:*

Be it known that I, WILLIAM H. LEWIS, a citizen of the United States, and a resident of Huntington, in the county of Suffolk and State of New York, have invented certain new and useful Improvements in Photograph-Printing Frames, of which the following is a specification.

The object of my improvement is to produce a photographic-printing frame adapted to effectually prevent leakage of light and possessing superior facility for inserting and removing the negative and the print-paper and for inspecting the progress of the printing without danger of shifting the print with relation to the negative.

To this end my invention consists, in part, in connecting the two parts of the jointed back by a sheet or web of flexible material, forming a hinge between the two parts of the back, while effectually preventing the passage of light at the joint, and, further, in novel construction and arrangement of flexible clamp-rods by which the back is held in closed position within the frame and a spring connected to the two members of the hinged back, permitting the main upper member to be turned back to open the frame and supporting it in inclined position to facilitate inspection of the print.

In the accompanying drawings, Figure 1 is a back view of a printing-frame, illustrating my invention. Fig. 2 is a side view of the same, showing the frame open. Fig. 3 is a section on the line 3 3, Fig. 1. Fig. 4 is a section on the line 4 4, Fig. 1.

5 represents the frame proper, constructed, preferably, of metal angle-plates to provide the required seat for the negative 6.

7 indicates the location of the print.

8 represents the customary pad, of soft material, forming the inner face of the frame-back.

9 9ª represent the two parts of the hinged back, and 10 a web of flexible material cemented thereto, forming a hinge between them at 11 and effectually preventing the passage of light through the hinge-joint.

To secure the back in position in the frame, I provide the frame with two pairs of hook-formed lugs 12 13, and the respective members 9 9ª of the hinged back with flexible clamp-rods 14 15, secured, respectively, to the members 9 9ª of the back, near to the center, by fixed eyes 16, so as to hold the said rods securely in position, while leaving their ends free to bend. The said clamp-rods 14 15 extend across the frame and project beyond the sides of the frame, as shown in Figs. 1 and 4, so as to engage with the lugs 12 13 and afford facility for bending them down therefrom, as illustrated in the case of the rod 14 in Fig. 1, whereby the movable main part 9 of the hinged back is released to admit of its being turned back, as shown in Fig. 2, to open the frame in order to inspect the progress of the printing. In order to remove the entire back from the frame for insertion of a new sheet or placing a negative in position, the flexible rod 15, holding the lower member of the frame, is bent down in similar manner to release it from the lugs 13.

To adapt the upper member 9 of the back to turn on its hinge 11 when the clamp-rod 14 is released from the lugs 12 and to support it in the inclined position shown in Fig. 2 while the printing is inspected, I employ a coiled spring 17, attached at its respective ends to the centers of the clamp-rods 14 and 15 between the eyes 16, by which they are attached to the members 9 9ª of the back.

Having thus described my invention, the following is what I claim as new therein and desire to secure by Letters Patent:

1. The combination with a frame, of a removable back, composed of two members having a padded facing on the under sides and hinged together on their upper sides by a web of flexible light-proof material, and means for removably securing said back in said frame.

2. The combination of the frame 5; hinged back 9, 9ª; suitable clamps 14, 15 for securing the back, and the spring 17 for supporting the upper member of the back in inclined position, as described.

3. The combination of the frame 5; hinged back 9, 9ª; clamp-rods 14, 15; lugs 12, 13, and supporting-spring 17, substantially as and for the purposes described.

4. The combination with a frame, of a removable back composed of two members, having padded facings on their under sides, and hinged together on their upper sides by a web of flexible light-proof material, clamps for removably securing said back to said frame, and a spring for supporting one of said members in inclined position.

5. In photographic-printing frames the combination with a frame of a hinged back, composed of two members, each of such members being provided with spring clamp-rods, rigidly secured to the back thereof, and adapted to secure the back in the frame by springing the clamp-rods under suitable stationary lugs on the frame.

Signed at Huntington, in the county of Suffolk and State of New York, this 11th day of December, A. D. 1900.

WILLIAM H. LEWIS.

Witnesses:
   HIRAM A. BAYLIS,
   ADDISON W. SUMMIS.